(12) United States Patent
Urac et al.

(10) Patent No.: US 12,492,643 B1
(45) Date of Patent: Dec. 9, 2025

(54) EXTENDED BANANA FOOT STATOR

(71) Applicant: Pratt & Whitney Canada Corp., Longueuil (CA)

(72) Inventors: Tibor Urac, Mississauga (CA); Richard Ivakitch, Scarborough (CA); Piotr Szczesnowicz, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/787,289

(22) Filed: Jul. 29, 2024

(51) Int. Cl.
*F01D 9/04* (2006.01)
*F01D 5/30* (2006.01)

(52) U.S. Cl.
CPC ............... *F01D 9/041* (2013.01); *F01D 5/30* (2013.01); *F05D 2220/323* (2013.01); *F05D 2230/10* (2013.01); *F05D 2230/60* (2013.01); *F05D 2240/12* (2013.01)

(58) Field of Classification Search
CPC . F01D 9/04; F01D 9/041; F01D 9/042; F05D 2230/60; F05D 2240/12
See application file for complete search history.

(56) References Cited

U.S. PATENT DOCUMENTS

| | | | |
|---|---|---|---|
| 6,543,998 B1 | 4/2003 | Scharl | |
| 8,047,771 B2 | 11/2011 | Tucker et al. | |
| 8,740,557 B2 * | 6/2014 | Durocher | F01D 9/044 |
| | | | 416/213 R |
| 9,970,307 B2 | 5/2018 | Kanjiyani et al. | |
| 11,466,581 B1 * | 10/2022 | Snider | F01D 9/044 |
| 11,480,062 B1 * | 10/2022 | Deivernois | F01D 9/04 |
| 2018/0171809 A1 * | 6/2018 | Urac | F01D 9/042 |

* cited by examiner

*Primary Examiner* — Nathaniel E Wiehe
*Assistant Examiner* — Maxime M Adjagbe
(74) *Attorney, Agent, or Firm* — CANTOR COLBURN LLP (57) ABSTRACT

A stator vane is provided and includes an airfoil section, a banana foot section including a radially outermost surface and a fillet. The fillet is radially interposed between the radially outermost surface of the banana foot section and the airfoil section. Respective outermost peripheries of the fillet and the radially outermost surface of the banana foot section define first and second footprints, respectively, in corresponding axial and circumferential dimensions. At least a section of the second footprint extends beyond a corresponding section of the first footprint in at least one of the corresponding axial and circumferential dimensions.

11 Claims, 6 Drawing Sheets

EXTENDED BANANA FOOT STATOR

BACKGROUND

The present disclosure relates to gas turbine engines and, more particularly, to brazed stator vanes of a gas turbine engine.

A gas turbine engine of a type provided for use in subsonic flight generally includes in serial flow communication a fan through which ambient air is propelled, a compressor for pressurizing the air, a combustor in which the compressed air is mixed with fuel and ignited for generating an annular stream of hot combustion gases and a turbine section for extracting energy from the combustion gases. In many instances, the compressor section and the turbine section each include a plurality of rotor stages and a plurality of stator vane stages. The rotor stages within the compressor section rotate about a rotational axis. Likewise, the rotor stages within the turbine section rotate about a rotational axis. Each rotor stage typically includes a hub with a plurality of rotor blades extending radially outward from the hub. A compressor section may include one or more stator vane stages, each including a plurality of stator vanes disposed around the circumference of the stage. In an axial flow gas turbine engine, the stator vanes extend radially between inner and outer gas path structures that define the gas flow path. The stator vanes are typically configured to direct airflow into a rotor stage or to direct airflow exiting a rotor stage.

There are typically two types of compressor stator vanes: shrouded stator vanes and cantilever stator vanes. Shrouded stator vanes are bonded at both ends whereas a cantilever stator vane has an airfoil section with a radial gap between itself and a rotating hub. The choice for either of the designs is typically based on mechanical considerations instead of aerodynamic considerations. A shrouded stator vane is stiffer and less prone to failures caused by aerodynamically induced vibrations, e.g., vibrations induced during flight. On the other hand, cantilevered stator vanes are distinctly less expensive to manufacture and have some aerodynamic benefits when the radial gap is tight. Thus, most front stator vane stages with a high aspect ratio are equipped with a shrouded design whereas later stages can employ a cantilever type design.

BRIEF DESCRIPTION

According to an aspect of the disclosure, a stator vane is provided and includes an airfoil section, a banana foot section including a radially outermost surface and a fillet. The fillet is radially interposed between the radially outermost surface of the banana foot section and the airfoil section. Respective outermost peripheries of the fillet and the radially outermost surface of the banana foot section define first and second footprints, respectively, in corresponding axial and circumferential dimensions. At least a section of the second footprint extends beyond a corresponding section of the first footprint in at least one of the corresponding axial and circumferential dimensions.

In accordance with additional or alternative embodiments, an exterior surface of the fillet extends along a curvilinear path from the radially outermost surface of the banana foot section to the airfoil section, the airfoil section includes leading and trailing edges and opposed pressure and suction surfaces extending between the leading and trailing edges and the banana foot section includes leading and trailing edges corresponding to the leading and trailing edges of the airfoil section and opposed pressure-side and suction-side surfaces extending between the leading and trailing edges and corresponding to the opposed pressure and suction surfaces of the airfoil section.

In accordance with additional or alternative embodiments, the second footprint extends beyond the first footprint in at least one of forward and rearward axial dimensions.

In accordance with additional or alternative embodiments, the second footprint extends beyond the first footprint in at least one of pressure side facing and suction side facing circumferential dimensions.

In accordance with additional or alternative embodiments, the second footprint extends beyond the first footprint in forward and rearward axial dimensions and in pressure side facing and suction side facing circumferential dimensions.

In accordance with additional or alternative embodiments, a thickness of the banana foot section is tapered along the at least one of the corresponding axial and circumferential dimensions.

In accordance with additional or alternative embodiments, a thickness of the banana foot section is at a maximum at a midpoint of the banana foot section along the corresponding axial dimension.

In accordance with additional or alternative embodiments, a thickness of the banana foot section is at a maximum at a midpoint of the banana foot section along the corresponding circumferential dimension.

In accordance with additional or alternative embodiments, the banana foot section is ribbed.

According to an aspect of the disclosure, a stator stage is provided and includes a shroud defining an opening and a stator vane. The stator vane includes an airfoil section, a banana foot section tightly fittable in the opening and including a radially outermost surface and a fillet. The fillet is radially interposed between the radially outermost surface of the banana foot section and the airfoil section. Respective outermost peripheries of the fillet and the radially outermost surface of the banana foot section define first and second footprints, respectively, in corresponding axial and circumferential dimensions. The opening and the banana foot section are sized such that at least a section of the second footprint extends beyond a corresponding section of the first footprint in at least one of the corresponding axial and circumferential dimensions.

In accordance with additional or alternative embodiments, the shroud defines multiple cavities arrayed in the corresponding circumferential dimension and the stator vane is provided as multiple stator vanes respectively corresponding to corresponding ones of the multiple cavities.

In accordance with additional or alternative embodiments, an exterior surface of the fillet extends along a curvilinear path from the radially outermost surface of the banana foot section to the airfoil section, the airfoil section includes leading and trailing edges and opposed pressure and suction surfaces extending between the leading and trailing edges and the banana foot section includes leading and trailing edges corresponding to the leading and trailing edges of the airfoil section and opposed pressure-side and suction-side surfaces extending between the leading and trailing edges and corresponding to the opposed pressure and suction surfaces of the airfoil section.

In accordance with additional or alternative embodiments, the second footprint extends beyond the first footprint in at least one of forward and rearward axial dimensions.

In accordance with additional or alternative embodiments, the second footprint extends beyond the first footprint in at least one of pressure side facing and suction side facing circumferential dimensions.

In accordance with additional or alternative embodiments, the second footprint extends beyond the first footprint in forward and rearward axial dimensions and in pressure side facing and suction side facing circumferential dimensions.

In accordance with additional or alternative embodiments, a thickness of the banana foot section is tapered along the at least one of the corresponding axial and circumferential dimensions.

In accordance with additional or alternative embodiments, a thickness of the banana foot section is at a maximum at a midpoint of the banana foot section along the corresponding axial dimension.

In accordance with additional or alternative embodiments, a thickness of the banana foot section is at a maximum at a midpoint of the banana foot section along the corresponding circumferential dimension.

In accordance with additional or alternative embodiments, the stator stage further includes braze material interposable between corresponding sidewalls of the opening and the banana foot section and the corresponding sidewalls of the opening and the banana foot section point away from the fillet to encourage braze overflow to flow away from the fillet.

According to an aspect of the disclosure, a method of assembling a stator stage is provided and includes forming a shroud defining an opening, forming a stator vane to include an airfoil section and a banana foot section tightly fittable in the opening and comprising a radially outermost surface, machining a portion of the stator vane into a fillet radially interposed between the radially outermost surface of the banana foot section and the airfoil section and sizing the opening and the banana foot section such that at least a section of a footprint of the radially outermost surface of the banana foot section extends beyond a corresponding section of a footprint of the fillet in at least one of axial and circumferential dimension.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Banana foot stator vanes are characterized in that a fillet radius is created using stator vane parent material rather than having braze form a fillet joining the stator vane to a shroud. During manufacturing processes, a banana foot stator vane is formed with a banana foot section attached to an airfoil section and a stator vane fillet at the intersection of the banana foot section and the airfoil section is machined. An opening in the shape of the banana foot cross section plus a gap is formed in the shroud. The banana foot section is then inserted into the opening, secured into place with a tack weld, the braze material is applied to the space between the banana foot section and the shroud and the assembly is heated in an oven. Since there are many stator vane modes that experience high stresses at the stator vane fillet, having the stator vane fillet formed with a higher capability material, such as the stator vane parent material, as compared to the braze material tends to improve dynamic stress margins. It has been found, however, that if the banana foot section is too small, it can be difficult to prevent braze overflow moving up onto the stator vane fillet. This reduces the dynamic stress margins.

Thus, as will be described below, in order to reduce or prevent the incidence of braze overflow moving up onto the stator vane fillet, the banana foot section of the banana foot stator vane is extended beyond the stator vane fillet to thereby increase a distance between the braze gap and the high stress region of the banana foot stator vane (i.e., the fillet radius). The increased distance to the braze gap effectively reduces the likelihood of braze overflow traveling up onto the stator vane fillet. In addition, a thickness of the banana foot section can be tapered in combination with the widening to thus increase support stiffness and better tune the mode frequency out of running range.

Figure 1:
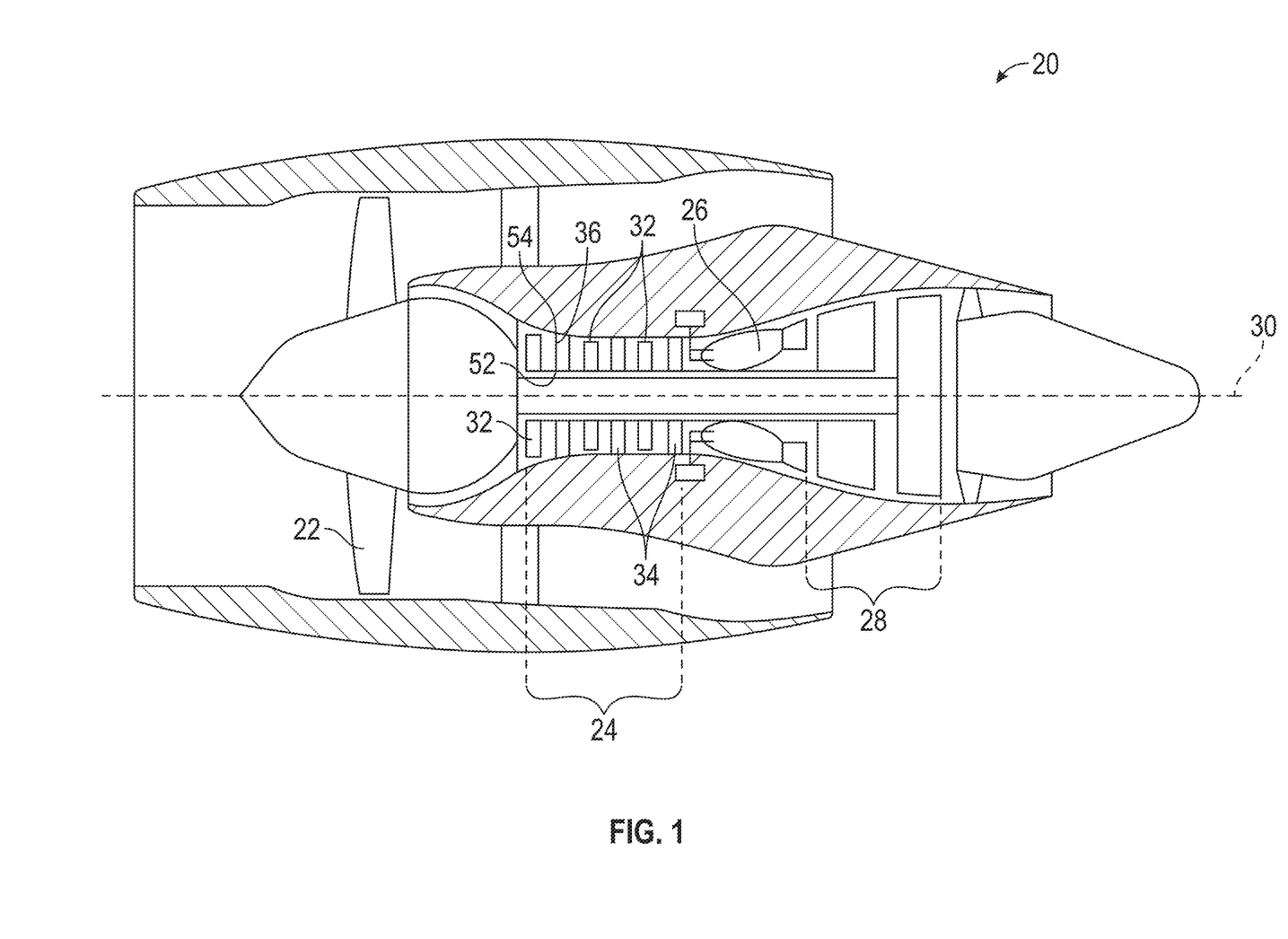
FIG. 1 is a side schematic illustration of a gas turbine engine for use in an aircraft in accordance with embodiments.

With reference to FIG. 1, a gas turbine engine 20 of a type provided for use in subsonic flight is provided. The gas turbine engine 20 includes in serial flow communication a fan 22 through which ambient air is propelled, a compressor section 24 for pressurizing the air, a combustor 26 in which the compressed air is mixed with fuel and ignited for generating an annular stream of hot combustion gases and a turbine section 28 for extracting energy from the combustion gases. The gas turbine engine 20 example shown in FIG. 1 is a two-spool turbofan rotating about a rotational axis 30. The present disclosure is not limited to use with two spool turbofan engines. In addition, the gas turbine engine example shown in FIG. 1 is shown as having spools rotating about the same rotational axis. The present disclosure is not limited to use with gas turbine engines having a plurality of spools rotating about the same rotational axis. It should be understood that the concepts described herein may be applied to a variety of gas turbine engine architectures, including gas turbine engines having geared architectures.

The compressor section 24 may include a single compressor section or more than one compressor section (e.g., a low pressure compressor and a high pressure compressor). To facilitate the description herein, the compressor section 24 will be described below in terms of a single compressor section, but the present disclosure is not limited thereto. The compressor section 24 may include one or more axial compressor rotor stages 32 and one or more compressor stator stages 34 that may be located immediately downstream of a compressor rotor stage 32. It should be noted that the terms "upstream" and "downstream" used herein refer to the direction of an air/gas flow passing through an annular gas path of the gas turbine engine 20. It should also be noted that the terms "radial" and "circumferential" are used herein with respect to the longitudinal rotational axis 30 of the gas turbine engine 20. Each compressor rotor stage 32 includes a hub with a plurality of rotor blades extending radially outward from the hub and distributed around the circumference of the compressor rotor stage and each compressor rotor stage 32 is configured to rotate about the rotational axis 30 of the gas turbine engine 20 to perform work on the air. Each compressor stator stage 34 is a non-rotating component that guides the flow of pressurized air towards or away from a compressor rotor stage 32. Each compressor stator stage 34 has a plurality of stator vanes 36 extending between inner gas path structure 52 and outer gas path structure 54 as a shrouded stator vane or as a cantilevered stator vane. Each stator vane 36 is configured to diffuse the airflow impinging thereon and to redirect the airflow (e.g., toward the next downstream compressor rotor stage 32).

Each stator vane 36 has an airfoil-shaped body having a suction side surface, a pressure side surface, a leading edge, a trailing edge and radial root and tip ends. Typically, each stator vane 36 is solid with continuous material between the suction side surface and the pressure side surface and with no internal voids other than as described herein although it is to be understood that this is not required and that embodiments exist in which one or more stator vanes have internal voids (e.g., for cooling). A chord length or chord line of the airfoil-shaped body is defined between the leading edge and the trailing edge. The suction side surface and the pressure side surface extend chordwise between the leading edge and the trailing edge and radially (also referred to as "spanwise") between. The stator vanes 36 in the compressor stator stages 34 are typically spaced equidistantly from one another around the circumference of the stator vane stage 34. The stator vanes 36 can be positionally fixed or pivotally mounted to permit the stator vanes 36 to be rotated relative to the incidence angle of airflow entering the compressor stator stage 34.

Figure 2:
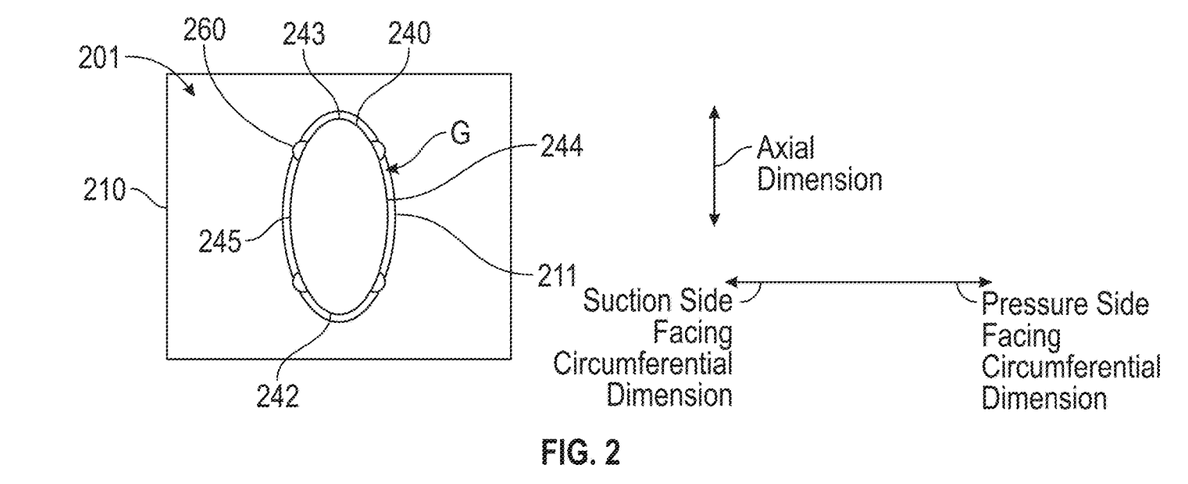
FIG. 2 is a radial view of a stator stage and a stator vane thereof of the gas turbine engine of FIG. 1 in accordance with embodiments.
Figure 3:
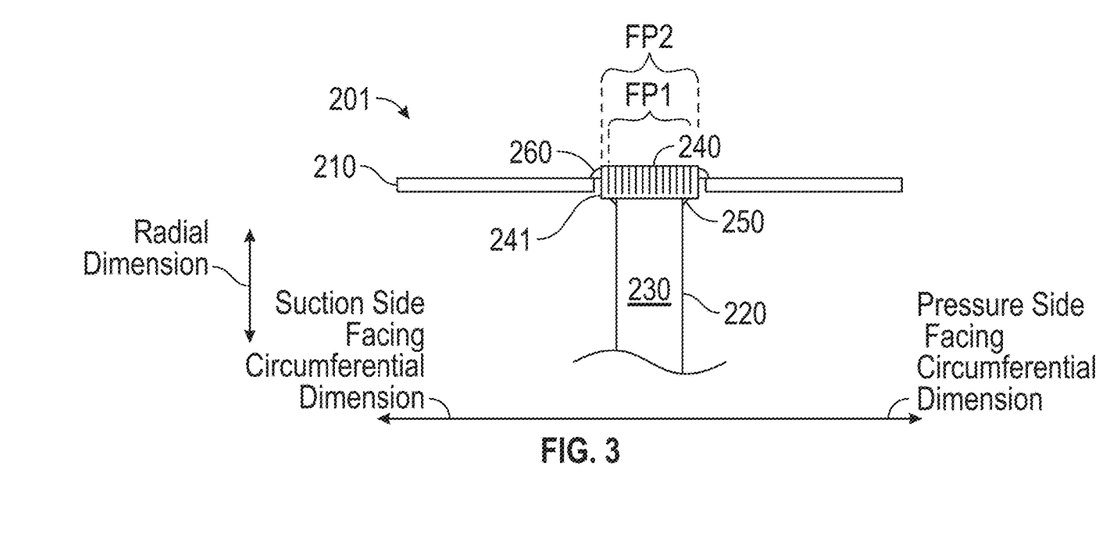
FIG. 3 is a side view of the stator stage and the stator vane thereof of FIG. 2 in accordance with embodiments.

With continued reference to FIG. 1 and with additional reference to FIGS. 2-5, a stator stage 201 (in FIG. 3, the stator stage 201 is illustrated flat for purposes of clarity and brevity but is actually curved), such as the compressor stator stage 34 of FIG. 1, is provided. The stator stage 201 includes a shroud 210 defining multiple openings 211 arrayed along a circumferential dimension of the shroud 210 and multiple stator vanes 220 (only a single stator vane 220 is illustrated in FIGS. 2 and 3 for purposes of clarity and brevity). Each of the multiple stator vanes 220 respectively corresponds to a corresponding one of the multiple openings 211. The shroud 210 can be provided as one or both of the inner gas path structure 52 and the outer gas path structure 54 of FIG. 1.

As used herein, the circumferential dimension is defined about the longitudinal rotational axis 30 of FIG. 1, an axial dimension is defined along the longitudinal rotational axis 30 of FIG. 1 and a radial dimension is defined to extend radially outwardly from the longitudinal rotational axis 30 of FIG. 1.

For each of the multiple stator vanes 220, the stator vane 220 includes an airfoil section 230, a banana foot section 240, which is fittable in the (corresponding) opening 211 and which includes a radially outermost surface 241, and a fillet 250. The opening 211 is larger than the banana foot section 240 and the banana foot section 240 is at least initially secured in the opening 211 by tack welds 260 or other similar fastening elements. In this initial condition, a gap G is formed between an exterior of the banana foot section 240 and an interior of the opening 211. The fillet 250 is radially interposed between the radially outermost surface 241 of the banana foot section 240 and the airfoil section 230 and includes an exterior surface 251 (see FIG. 4) that extends along a curvilinear path from a tangential intersection with the radially outermost surface 241 of the banana foot section 240 to a tangential intersection with the airfoil section 230. The airfoil section 230 includes leading and trailing edges 231 and 232 and opposed pressure and suction surfaces 233 and 234 extending between the leading and trailing edges 231 and 232 (see FIG. 4). The banana foot section 240 similarly includes leading and trailing edge portions 242 and 243 corresponding to the leading and trailing edges 231 and 232 of the airfoil section 230 and opposed pressure-side and suction-side surface portions 244 and 245 extending between the leading and trailing edge portions 242 and 243 and corresponding to the opposed pressure and suction surfaces 233 and 234 of the airfoil section 230 (see FIG. 2).

Figure 4:
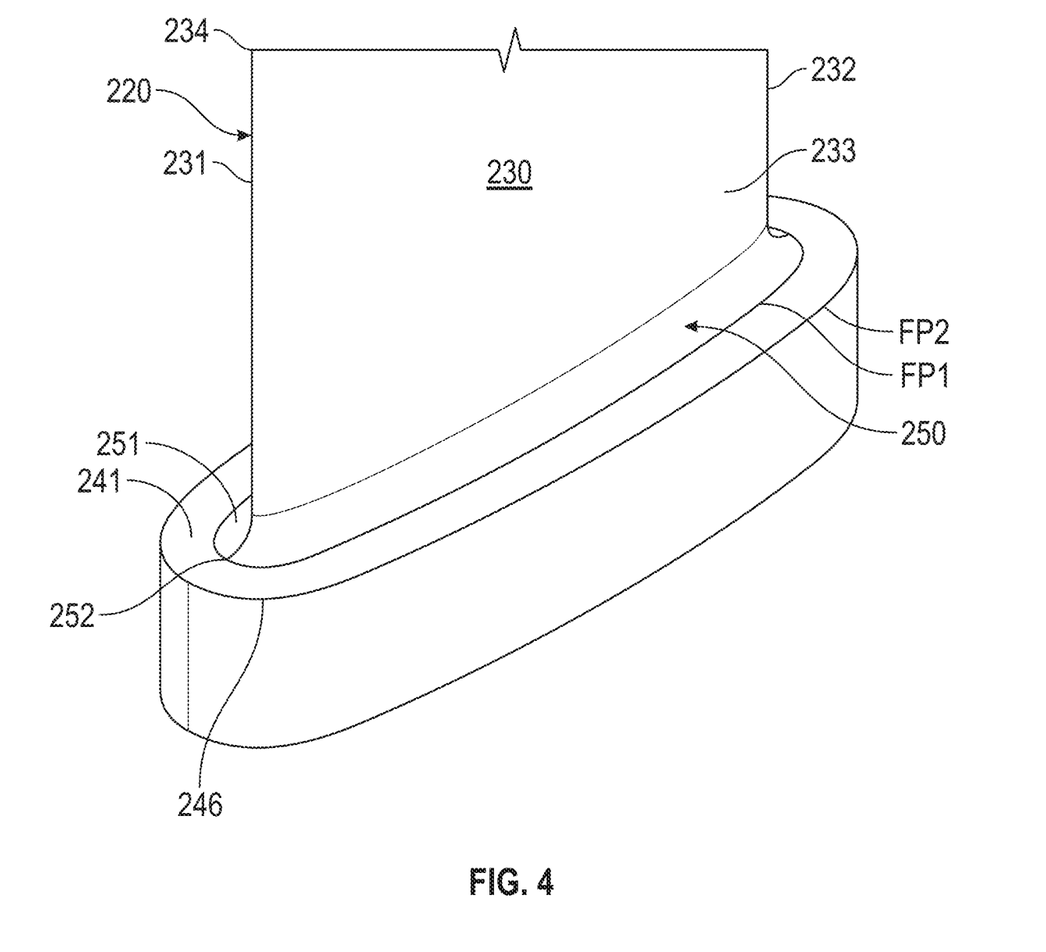
FIG. 4 is a perspective view of a stator vane and a shroud of the stator stage of FIGS. 2 and 3 in accordance with embodiments.
Figure 5:
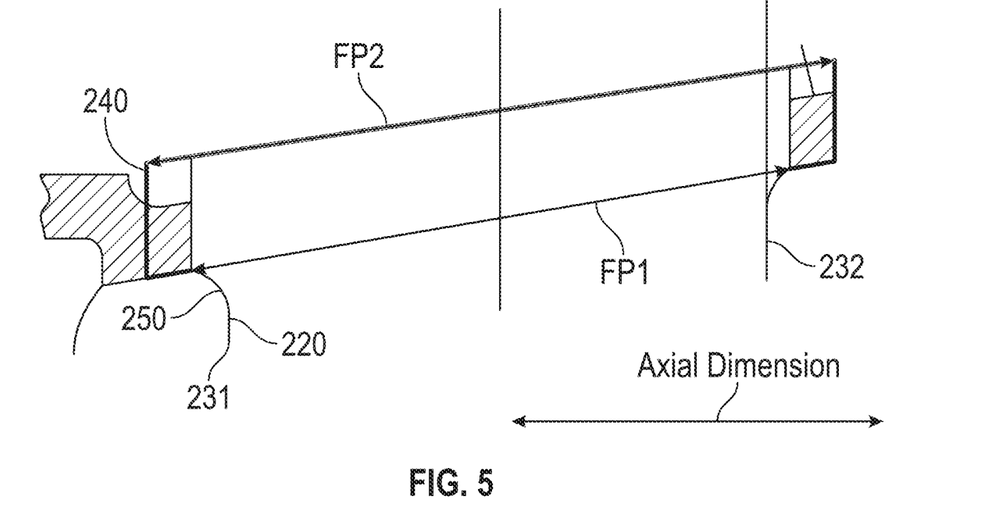
FIG. 5 is a side view of the stator vane of FIGS. 2-4 in accordance with embodiments.

As shown in FIGS. 3, 4 and 5, the fillet 250 has an outermost periphery 252 that is defined along the tangential intersection of the exterior surface 251 with the radially outermost surface 241. The outermost periphery 252 of the fillet defines a first footprint FP1 in the axial and circumferential dimensions. The radially outermost surface 241 of the banana foot section 240 has an outermost periphery 246. The outermost periphery 246 of the radially outermost surface 241 defines a second footprint FP2 in the axial and circumferential dimensions. The opening 211 and the banana foot section 240 are sized such that at least a section of the second footprint FP2 extends beyond a corresponding section of the first footprint FP1 in at least one of the corresponding axial and circumferential dimensions. That is, in accordance with embodiments, the second footprint FP2 can extend beyond the first footprint FP1 in at least one of forward and rearward axial dimensions, the second footprint FP2 can extend beyond the first footprint FP1 in at least one of pressure side facing and suction side facing circumferential dimensions and/or the second footprint FP2 can extend beyond the first footprint FP1 in the forward and rearward axial dimensions as well as in the pressure side facing and suction side facing circumferential dimensions. In accordance with further and/or alternative embodiments, the second footprint FP2 can extend beyond the first footprint FP1 in regular patterns or irregular patterns.

During assembly operations, each stator vane 220 is installed into the corresponding opening 211 and tack welded in place (i.e., by the tack welds illustrated in FIGS. 2 and 3). Subsequently, braze material is applied and the assembly is heated in an oven. During the heating, the braze material flows into and throughout the gap G. Due to the opening 211 and the banana foot section 240 being sized such that at least a section of the second footprint FP2 extends beyond a corresponding section of the first footprint FP1 in at least one of the corresponding axial and circumferential dimensions, the melted braze material is prevented from flowing up and onto the fillet 250.

Figure 6:
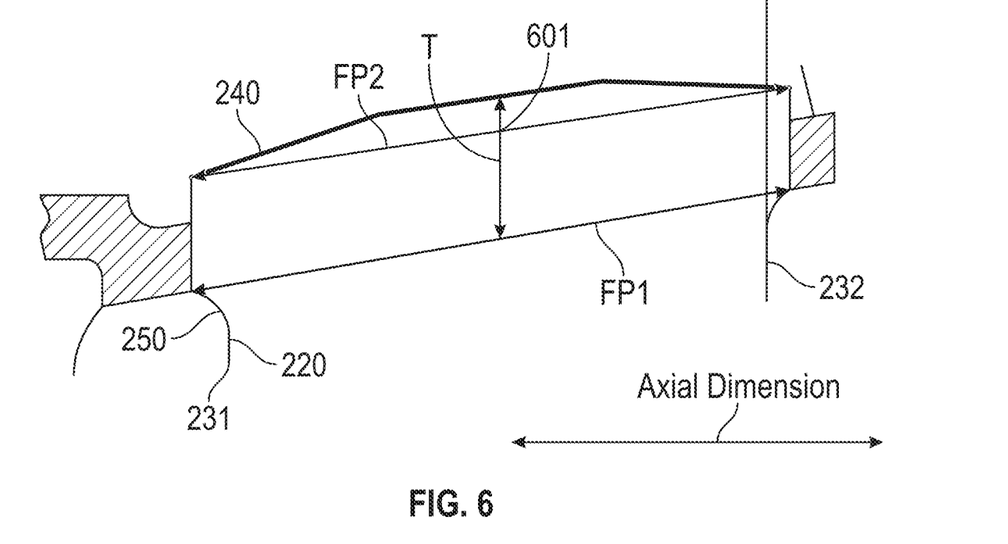
FIG. 6 is a side view of the stator vane of FIGS. 2-4 with a tapered banana foot section in accordance with embodiments.

With continued reference to FIGS. 2-5 and with additional reference to FIG. 6, a thickness T and/or width of the banana foot section 240 can be tapered along the at least one of the corresponding axial and circumferential dimensions and can be provided at a maximum at a midpoint 601 of the banana foot section 240 along the corresponding axial dimension and/or the corresponding circumferential dimension as shown in FIG. 6. By varying the thickness T and/or the width of the banana foot section 240, support stiffness can be increased without a corresponding weight impact of increasing an entire thickness T and/or width.

Figure 7:
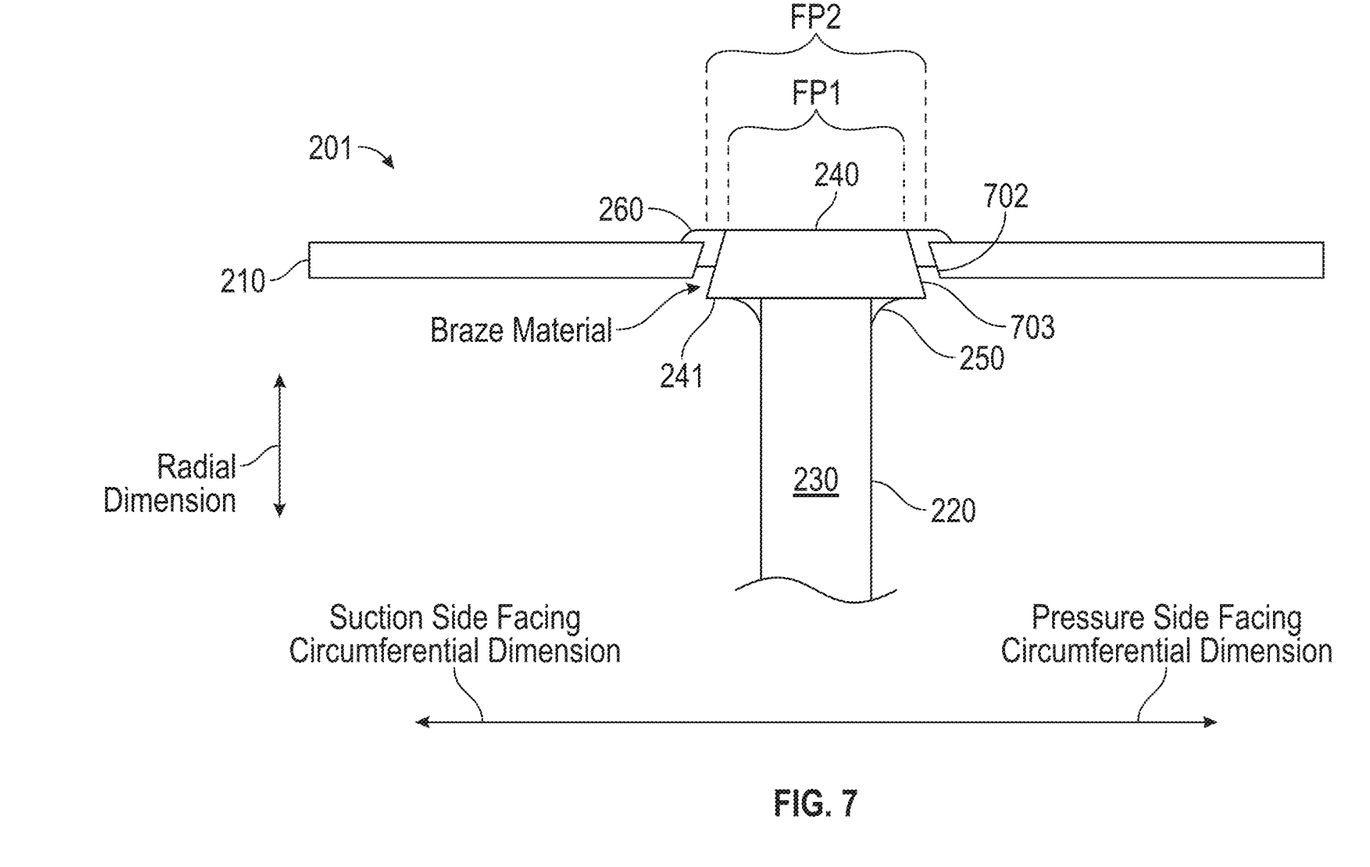
FIG. 7 is a schematic illustration of a portion of a stator stage of the gas turbine engine of FIG. 1 with a tapered opening and a tapered banana foot section in accordance with embodiments.

With continued reference to FIGS. 2-5 and with additional reference to FIG. 7, the braze material is disposable between corresponding sidewalls 702 and 703 of the opening 211 and the banana foot section 240, respectively, during the brazing operation and may run out during the heating in the oven. In these or other cases, the sizing of the opening 211 and the banana foot section 240 such that at least the section of the second footprint FP2 extends beyond the corresponding section of the first footprint FP1 in the at least one of the corresponding axial and circumferential dimensions is provided to effectively prevent or reduce braze overflow from flowing onto the exterior surface 251 of the fillet 250. As shown in FIG. 7 and in accordance with further embodiments, the corresponding sidewalls 702 and 703 of the opening 211 and the banana foot section 240, respectively, can be directed, tapered or otherwise pointed away from the fillet 250 to encourage braze overflow to flow away from the fillet 250. A plenum or sump can also be provided at the exit of the opening 211 to catch outflowing braze material that might otherwise flow to the fillet 250.

In accordance with additional embodiments and as shown in the left-most image of FIG. 2, the banana foot section 240 can be ribbed to decrease a total weight of the banana foot section 240.

Figure 8:
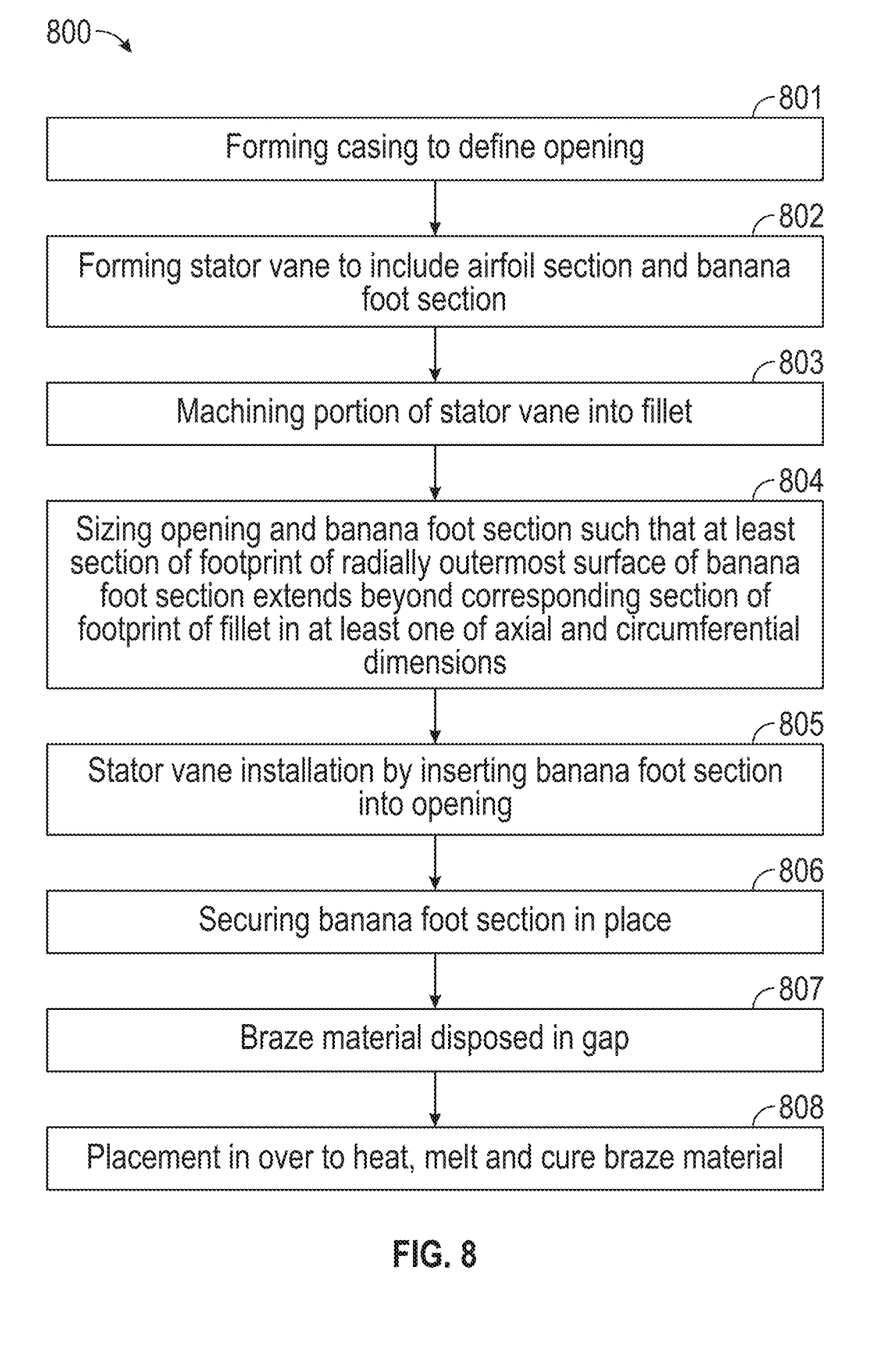
FIG. 8 is a flow diagram illustrating a method of assembling a stator stage in accordance with embodiments.

With reference to FIG. 8, a method 800 of assembling a stator stage, such as the stator stage 201 of FIGS. 2 and 3, is provided. As shown in FIG. 8, the method 800 includes forming a shroud defining an opening (block 801), forming a stator vane to include an airfoil section and a banana foot section tightly fittable in the opening and including a radially outermost surface (block 802) and machining a portion of the stator vane into a fillet radially interposed between the radially outermost surface of the banana foot section and the airfoil section (block 803). In addition, the method 700 can include sizing the opening and the banana foot section such that at least a section of a footprint of the radially outermost surface of the banana foot section extends beyond a corresponding section of a footprint of the fillet in at least one of axial and circumferential dimensions (block 804). The stator vane is then installed by inserting the banana foot section into the opening (block 805) and tack welding or otherwise securing the banana foot section in place (block 806). Next, braze material is disposed in the gap between the exterior surfaces of the banana foot section and the interior surfaces of the opening (block 807) and the assembly as a whole is placed in an oven to heat, melt and cure the braze material (block 808). As noted above, due to the opening and the banana foot section being sized such that at least a section of a footprint of the radially outermost surface of the banana foot section extends beyond a corresponding section of a footprint of the fillet in at least one of axial and circumferential dimensions, melted braze material is prevented from flowing up and onto the fillet. It is to be understood that the method described above is not sequential and that various operations can be executed in various sequences. For example, the sizing of the opening and the banana foot section can be accomplished in parallel with the forming operations of blocks 801 and 802.

Technical effects and benefits of the present disclosure are the provision of a banana foot stator vane having a fillet between an airfoil section and a banana foot section that is secured to a shroud without braze overflow traveling up onto the fillet. This prevents a reduction in dynamic stress margins of the assembly.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A stator stage, comprising:
a shroud defining an opening; and
a stator vane, the stator vane comprising:
    an airfoil section;
    a banana foot section fittable in the opening and comprising a radially outermost surface;
    braze material interposable between the radially outermost surface and corresponding sidewalls of the opening with the banana foot section fit in the opening; and
    a fillet radially interposed between the radially outermost surface of the banana foot section and the airfoil section,
wherein:
respective outermost axial and circumferential peripheries of the fillet and the radially outermost surface of the banana foot section defining first and second footprints, respectively, in corresponding axial and circumferential dimensions, and
the opening and the banana foot section being sized such that at least a section of the second footprint extends beyond a corresponding section of the first footprint in at least one of the corresponding axial and circumferential dimensions and such that, during a brazing process to secure the banana foot section in the opening, the braze material is prevented from flowing up and onto the fillet.

2. The stator stage according to claim 1, wherein the shroud defines multiple cavities arrayed in the corresponding circumferential dimension and the stator vane is provided as multiple stator vanes respectively corresponding to corresponding ones of the multiple cavities.

3. The stator stage according to claim 1, wherein:
- an exterior surface of the fillet extends along a curvilinear path from the radially outermost surface of the banana foot section to the airfoil section,
- the airfoil section comprises leading and trailing edges and opposed pressure and suction surfaces extending between the leading and trailing edges, and
- the banana foot section comprises leading and trailing edges corresponding to the leading and trailing edges of the airfoil section and opposed pressure-side and suction-side surfaces extending between the leading and trailing edges and corresponding to the opposed pressure and suction surfaces of the airfoil section.

4. The stator stage according to claim 1, wherein the second footprint extends beyond the first footprint in at least one of forward and rearward axial dimensions.

5. The stator stage according to claim 1, wherein the second footprint extends beyond the first footprint in at least one of pressure side facing and suction side facing circumferential dimensions.

6. The stator stage according to claim 1, wherein the second footprint extends beyond the first footprint in forward and rearward axial dimensions and in pressure side facing and suction side facing circumferential dimensions.

7. The stator stage according to claim 1, wherein a thickness of the banana foot section is tapered along the at least one of the corresponding axial and circumferential dimensions.

8. The stator stage according to claim 1, wherein a thickness of the banana foot section is at a maximum at a midpoint of the banana foot section along the corresponding axial dimension.

9. The stator stage according to claim 1, wherein a thickness of the banana foot section is at a maximum at a midpoint of the banana foot section along the corresponding circumferential dimension.

10. The stator stage according to claim 1, wherein the corresponding sidewalls of the opening and the banana foot section point away from the fillet to encourage braze overflow to flow away from the fillet.

11. A method of assembling a stator stage, the method comprising:
- forming a shroud defining an opening;
- forming a stator vane to comprise an airfoil section and a banana foot section fittable in the opening and comprising a radially outermost surface, which, with the banana foot section fit in the opening, forms a gap between the radially outermost surface and corresponding sidewalls of the opening;
- machining a portion of the stator vane into a fillet radially interposed between the radially outermost surface of the banana foot section and the airfoil section;
- sizing the opening and the banana foot section such that at least a section of a footprint of the radially outermost surface of the banana foot section extends beyond a corresponding section of a footprint of the fillet in at least one of axial and circumferential dimensions;
- inserting the banana foot section into the opening;
- interposing braze material in the gap between the radially outermost surface and the corresponding sidewalls of the opening; and
- executing brazing to secure the banana foot section in the opening,
- wherein the sizing is executed such that melted braze material is prevented from flowing up and onto the fillet during the executing of the brazing.

* * * * *